(12) United States Patent
Yang et al.

(10) Patent No.: US 10,936,130 B1
(45) Date of Patent: Mar. 2, 2021

(54) TOUCH DISPLAY PANEL AND DISPLAY APPARATUS

(71) Applicant: Xiamen Tianma Micro-Electronics Co., Ltd., Xiamen (CN)

(72) Inventors: Yizhi Yang, Xiamen (CN); Chuiyu Meng, Xiamen (CN)

(73) Assignee: Xiamen Tianma Micro-Etectronics Co., Ltd., Xiamen (CN)

( * ) Notice: Subject to any disclaimer, the term of this patent is extended or adjusted under 35 U.S.C. 154(b) by 0 days.

(21) Appl. No.: 16/728,718

(22) Filed: Dec. 27, 2019

(30) Foreign Application Priority Data

Sep. 30, 2019 (CN) .......................... 201910944393.4

(51) Int. Cl.
*G06F 3/041* (2006.01)
*G09G 3/36* (2006.01)
*G06F 3/044* (2006.01)

(52) U.S. Cl.
CPC .................................. *G06F 3/0443* (2019.05)

(58) Field of Classification Search
CPC ... G09G 3/36; G09G 5/00; G09G 3/00; G06F 3/045; G06F 3/041; G06F 3/044
See application file for complete search history.

(56) References Cited

U.S. PATENT DOCUMENTS

| | | | | |
|---|---|---|---|---|
| 2016/0291784 A1* | 10/2016 | Zhai | ...................... | G06F 3/0412 |
| 2019/0114007 A1* | 4/2019 | Mugiraneza | ............ | G06F 3/044 |
| 2020/0110483 A1* | 4/2020 | Lee | ....................... | G06F 3/0416 |

FOREIGN PATENT DOCUMENTS

| | | |
|---|---|---|
| CN | 103514829 A | 1/2014 |
| CN | 105093025 A | 11/2015 |
| CN | 105301822 A | 2/2016 |
| CN | 105373259 A | 3/2016 |
| CN | 106909253 A | 6/2017 |
| CN | 110688030 A | 1/2020 |
| CN | 110716665 A | 1/2020 |
| KR | 20180130712 A | 12/2018 |

OTHER PUBLICATIONS

International Search Report related to Application No. PCT/CN2020/078499 reported on Jul. 2, 2020.

* cited by examiner

*Primary Examiner* — Pegeman Karimi
(74) *Attorney, Agent, or Firm* — von Briesen & Roper, s.c.

(57) ABSTRACT

Disclosed are a touch display panel and a display apparatus. The touch display panel includes a display region and a non-display region; the display region includes multiple touch signal lines and multiple touch electrode blocks arranged in an array, and the multiple touch electrode blocks are electrically connected in one-to-one correspondence with multiple touch line groups, where each touch line group includes at least one touch signal line; and the non-display region includes multiple touch source lines, at least one common voltage source line and a multiplex selection circuit, where the multiplex selection circuit includes multiple multiplex selection units, the multiple multiplex selection units are arranged in one-to-one correspondence with the multiple touch source lines, and each multiplex selection unit has m output ends.

14 Claims, 5 Drawing Sheets

TOUCH DISPLAY PANEL AND DISPLAY APPARATUS

CROSS REFERENCE TO RELATED APPLICATION

This application claims the priority to Chinese Patent Application No. 2019109443914, filed on Sep. 30, 2019 and entitled "TOUCH DISPLAY PANEL AND DISPLAY APPARATUS", the disclosure of which is incorporated herein by reference in its entirety.

TECHNICAL FIELD

Embodiments of the present disclosure relate to a display technology, and in particular, relate to a touch display panel and a display apparatus.

BACKGROUND

With the rapid development of the display technology, a touch display apparatus has gradually penetrated into the life of each person, and common touch display apparatuses include smartphones, tablet computers, and the like.

A touch function and a display function are integrated in the touch display apparatus. According to an integrated mode of the touch function, a structure of the touch display apparatus may be at least divided into an out cell structure and an in cell structure. An in cell touch display apparatus integrates touch electrodes inside a display panel. In order to achieve thinness, a common electrode layer is usually divided into a plurality of touch electrode blocks for implementing the display function in a display phase and the touch function in a touch phase.

At present, in the in cell touch display apparatus, a large area of the border is occupied by common voltage signal traces and touch signal traces, so that a wide border is caused.

SUMMARY

Embodiments of the present disclosure provide a touch display panel and a display apparatus to achieve a narrow border.

A touch display panel provided in the embodiments of the present disclosure includes a display region and a non-display region surrounding the display region.

The display region includes a plurality of touch signal lines and a plurality of touch electrode blocks arranged in an array, and the plurality of touch electrode blocks are electrically connected in one-to-one correspondence with a plurality of touch line groups, where each of the plurality of touch line groups includes at least one of the plurality of touch signal lines.

The non-display region includes a plurality of touch source lines, at least one common voltage source line and a multiplex selection circuit, where the multiplex selection circuit includes a plurality of multiplex selection units, the plurality of multiplex selection units is arranged in one-to-one correspondence with the plurality of touch source lines, and each of the plurality of multiplex selection units has m output ends, where each of the m output ends of the each of the plurality of multiplex selection units is electrically connected to the one of the plurality of touch line groups, a first input end of the each of the plurality of multiplex selection units is electrically connected to one of the plurality of touch source lines, and a second input end of the each of the plurality of multiplex selection units is electrically connected to one of the at least one common voltage source line.

In a touch phase, the each of the plurality of multiplex selection units conducts signal transmission routes of the first input end of the each of the plurality of multiplex selection units and the m output ends of the each of the plurality of multiplex selection units to cause touch line groups corresponding to the each of the plurality of multiplex selection units to transmit touch signals.

In a display phase, the each of the plurality of multiplex selection units conducts signal transmission routes of the second input end of the each of the plurality of multiplex selection units and the m output ends of the each of the plurality of multiplex selection units to cause the touch line groups corresponding to the each of the plurality of multiplex selection units to transmit common voltage signals.

Based on the same inventive concept, the embodiments of the present disclosure further provide a display apparatus including the touch display panel described above.

BRIEF DESCRIPTION OF DRAWINGS

To illustrate technical solutions in the embodiments of the present disclosure or in the related art more clearly, drawings used in description of the embodiments or the related art will be briefly described below. Apparently, the drawings described below illustrate only part of the embodiments of the present disclosure, and those skilled in the art may obtain other drawings based on the drawings described below on the premise that no creative work is done.

DETAILED DESCRIPTION

In order to make the object, technical solutions and advantages of the present disclosure clearer, the technical solutions of the present disclosure will be described clearly and completely with reference to the drawings in embodiments of the present disclosure. Apparently, the embodiments described below are part, not all, of the embodiments of the present disclosure.

Based on the embodiments of the present disclosure, all other embodiments obtained by those skilled in the art without creative work are within the scope of the present disclosure.

Figure 1:
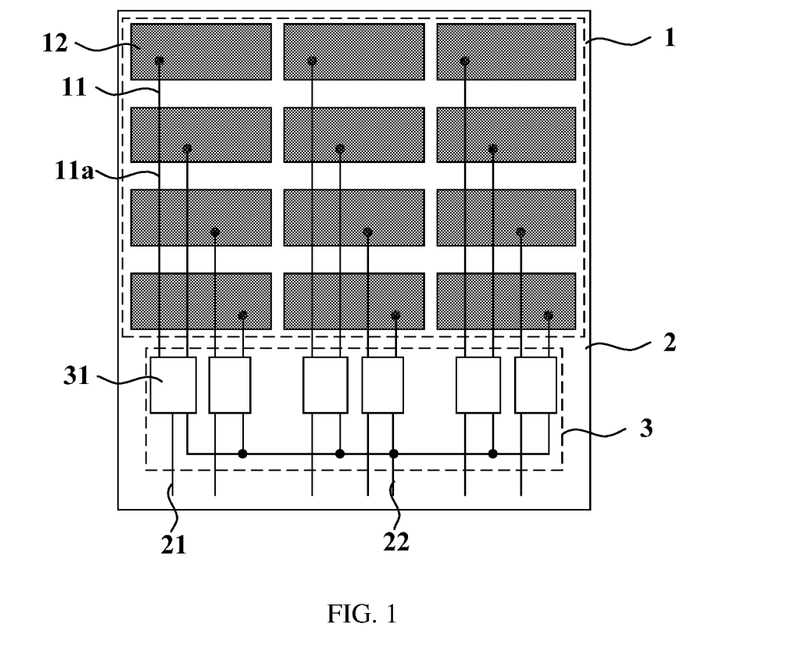
FIG. 1 is a schematic diagram of a touch display panel according to an embodiment of the present disclosure.

With reference to FIG. 1, FIG. 1 is a schematic diagram of a touch display panel according to an embodiment of the present disclosure. A touch display panel provided in the embodiment includes a display region 1 and a non-display region 2 surrounding the display region 1, where the display region 1 includes a plurality of touch signal lines 11 and a plurality of touch electrode blocks 12 arranged in an array, and the plurality of touch electrode blocks 12 are electrically connected in one-to-one correspondence with a plurality of touch line groups 11a, where each touch line group 11a includes at least one touch signal line 11; the non-display region 2 includes a plurality of touch source lines 21, at least one common voltage source line 22 and a multiplex selection circuit 3, where the multiplex selection circuit 3 includes a plurality of multiplex selection units 31, the plurality of multiplex selection units 31 are arranged in one-to-one correspondence with the plurality of touch source lines 21, and each multiplex selection units 31 has m output ends, where each output end of the multiplex selection unit 31 is electrically connected to the one touch line group 11a, a first input end of the each multiplex selection unit 31 is electrically connected to one touch source line 21, and a second input end of the each multiplex selection unit 31 is electrically connected to one common voltage source line 22. In a touch phase, the each multiplex selection unit 31 conducts signal transmission routes of the first input end of the each multiplex selection unit 31 and the m output ends of the each multiplex selection unit 31 to cause touch line groups 11a to transmit touch signals. In a display phase, the each multiplex selection unit 31 conducts signal transmission routes of the second input end of the each multiplex selection unit 31 and the m output ends of the each multiplex selection unit 31 to cause touch line groups 11a to transmit common voltage signals.

Figure 2:
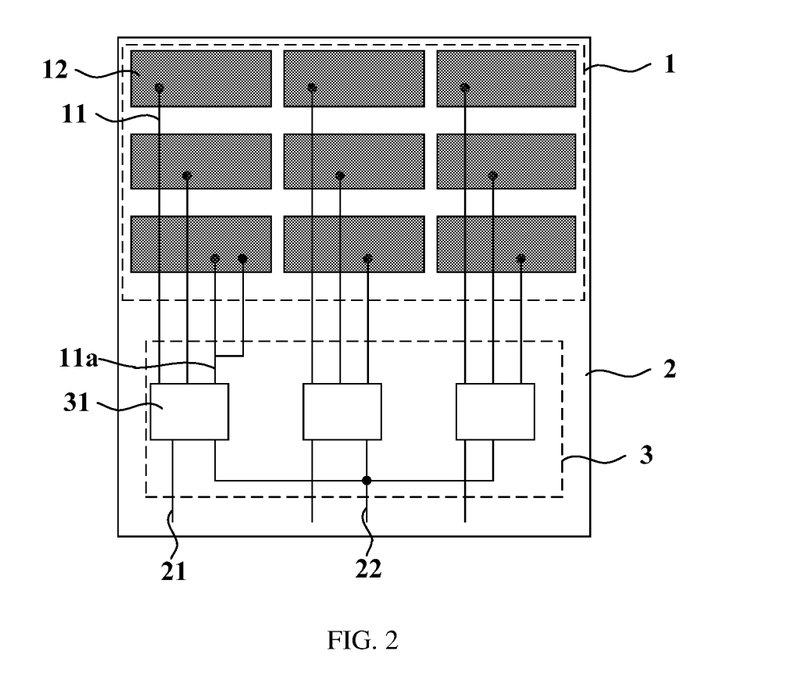
FIG. 2 is a schematic diagram of a touch display panel according to an embodiment of the present disclosure.

As shown in FIG. 1, optionally, one touch line group 11a includes one touch signal line 11, one touch electrode block 12 is electrically connected in correspondence with one touch signal line 11, and at this time, one touch line 11 is also characterized as one touch line group 11a; in the touch phase, a touch signal is transmitted between the touch signal line 11 and a touch electrode block 12 electrically connected in correspondence with the touch signal line 11. As shown in FIG. 2, optionally, one touch line group 11a includes two touch signal lines 11, and one touch electrode block 12 is electrically connected in correspondence with two touch signal lines 11; in the touch phase, touch signals are transmitted between the two touch signal lines 11 and a same touch electrode block 12 electrically connected in correspondence with the two touch signal lines 11 at the same time. It can be understood that the specific number of touch signal lines included in the touch line group is not specifically limited, the number of touch signal lines included in each touch line group may be the same or different, and the number of touch signal lines included in the each touch line group may be reasonably set by the related practitioner according to the requirement of a product.

As shown in FIG. 1, optionally; m=2, and then one multiplex selection unit 31 is electrically connected to two adjacent touch line groups 11a in a same column. In other embodiments, further optionally, m=3, and then one multiplex selection unit 31 is electrically connected to three adjacent touch line groups 11a in a same column. It can be understood that the number of output ends of each multiplex selection unit in a display panel is the same.

In the embodiment, the touch display panel includes the display region 1 and the non-display region 2. The display region 1 is a display function region, where a plurality of sub-pixels (not shown) for display and light emitting are provided. The non-display region 2 is an external circuit region, where a display driving circuit (not shown) and a touch driving circuit (not shown) for performing touch and display control are provided. No specific structure or tracing is described in the present disclosure.

In the embodiment, the display region 1 includes the plurality of touch signal lines 11 and the plurality of touch electrode blocks 12 arranged in an array, and the plurality of touch electrode blocks 12 are electrically connected in one-to-one correspondence with the plurality of touch line groups 11a, where each touch line group 11a includes at least one touch signal line 11. Here, the touch electrode block 12 is electrically connected to the touch line group 11a, and when a plurality of touch signal lines 11 are included in the touch line group 11a, the driving capacity can be enhanced.

In the embodiment, the non-display region 2 includes the plurality of touch source lines 21, at least one common voltage source line 22 and the multiplex selection circuit 3, where the multiplex selection circuit 3 includes the plurality of multiplex selection units 31, the plurality of multiplex selection units 31 are arranged in one-to-one correspondence with the plurality of touch source lines 21, and each multiplex selection unit 31 has m output ends, where each output end of the multiplex selection unit 31 is electrically connected to one touch line group 11a.

Here, one multiplex selection unit 31 corresponds to one touch source line 21, and one multiplex selection unit 31 is electrically connected to m touch line groups 11a, so that touch signal transmission can be achieved between one touch source line 21 and in touch electrode blocks 12 in time division. The touch source line 21 is electrically connected to a touch signal port of the touch driving circuit, and the larger the number of ports of the touch driving circuit is, the higher the cost is. In a case where the same number of touch electrode blocks 12 is required, the number of touch signal ports of the touch driving circuit is reduced in the embodiment, and the effect of reducing the cost is achieved. Touch signal transmission is achieved between one touch source line and m touch electrode blocks 12 in time division, the number of touch source lines is greatly reduced, the occupied border area can be reduced, and the narrow border is achieved. For medium-sized and large-sized touch display panels, in the related art, there may exist a condition that the number of touch signal ports is insufficient, and at this time, a part of the touch electrode blocks are not engaged in touch, so that the touch area of the touch electrode block is increased and the touch precision is low. In the embodiment, touch signal transmission is achieved between one touch source line 21 and m touch electrode blocks 12 in time division, full-screen touch is achieved, the problem that touch precision is low due to the insufficient number of touch signal ports can be solved, and the touch precision is improved.

Here, optionally, the non-display region 2 includes one common voltage source line 22, and the second input end of each multiplex selection unit 31 is electrically connected to the common voltage source line 22. In other embodiment, further optionally, the non-display region includes two common voltage source lines, second input ends of two adjacent multiplex selection units are electrically connected to different common voltage source lines, where the two adjacent multiplex selection units specifically refer to two multiplex selection units electrically connected to adjacent touch electrode blocks in a same column. In the embodiment, the common voltage source line 22 and the touch driving circuit are located on a same side of the display region 1, compared with the related art in which the common voltage source line and a driving chip are located on different sides of the display region, the embodiment reduces an area occupied by the traces of the common voltage source line in the non-display region, and the narrow border is achieved.

The total number of output ends of the multiplex selection circuit 3 is the same as the total number of touch electrode blocks 12, and the total number of output ends of the multiplex selection circuit 3 is the same as the total number of touch line groups 11a. The total number of multiplex selection units 31 in the multiplex selection circuit 3 is the same as the total number of touch source lines 21. Them output ends of each multiplex selection unit 31 are electrically connected in one-to-one correspondence with m touch line groups 11a corresponding to adjacent in touch electrode blocks 12 in the same column. Specifically, for one multiplex selection unit 31, the in output ends of the one multiplex selection unit 31 are sequentially electrically connected in one-to-one correspondence with the m touch line groups 11a corresponding to the adjacent m touch electrode blocks 12 in the same column.

As shown in FIG. 1, optionally, the multiplex selection unit 31 has two output ends. Exemplarily, the touch display panel includes (4*3) touch electrode blocks 12 and 6 multiplex selection units 31, where the two output ends of one multiplex selection unit 31 are sequentially electrically connected in correspondence with the two touch line groups 11a corresponding to two adjacent touch electrode blocks 12 in the same column.

In the embodiment, the first input end of the multiplex selection unit 31 is electrically connected to the touch source line 21, and the second input end of the multiplex selection unit 31 is electrically connected to the common voltage source line 22. In the touch phase, the multiplex selection unit 31 conducts signal transmission routes of the first input end of the multiplex selection unit 31 and the output ends of the multiplex selection unit 31 to cause the touch line groups 11a to transmit touch signals. In the display phase, the multiplex selection unit 31 conducts signal transmission routes of the second input end of the multiplex selection unit 31 and the output ends of the multiplex selection unit 31 to cause the touch line groups 11a to transmit common voltage signals.

The touch signal includes a touch driving signal and a touch sensing signal. Specifically, in the touch phase, a touch driving signal is transmitted to a touch electrode block 12 electrically connected to a touch line group 11a through the touch line group 11a, the touch electrode block 12 outputs a touch sensing signal through the touch line group 11a, and the touch driving circuit determines a touch position according to the changes of the touch driving signal and the touch sensing signal of the touch electrode block.

As shown in FIG. 1, m=2, and the multiplex selection unit 31 is electrically connected to the touch line groups 11a of two adjacent touch electrode blocks in the same column, where the first output end of the multiplex selection unit 31 is electrically connected to the touch line group 11a of the touch electrode block 12 in an odd row, and the second output end of the multiplex selection unit 31 is electrically connected to the touch line group 11a of the touch electrode block 12 in an even row. The touch phase is divided into in touch sub-phases, as shown in FIG. 1, m=2, and then the touch phase is divided into two touch sub-phases.

In a first touch sub-phase, each multiplex selection unit 31 conducts a signal transmission routes between the first input end of the multiplex selection unit 31 and the first output end of the multiplex selection unit 31, and the touch source line 21 transmits the touch signal through the touch line group 11a to the touch electrode block 12 in an odd row. Therefore, in the first touch sub-phase, a first row of touch electrode blocks 12 and a third row of touch electrode blocks 12 are subjected to touch detection at the same time. The plurality of touch source lines 21 transmit the touch driving signals to the first row and the third row of touch electrode blocks 12 through the touch line groups 11a, and the first row and the third row of touch electrode blocks 12 output touch sensing signals through the touch source lines 21.

In a second touch sub-phase, each multiplex selection unit 31 conducts a signal transmission route between the first input end of the multiplex selection unit 31 and the second output end of the multiplex selection unit 31, and the touch source line 21 transmits the touch signal through the touch line group 11a to the touch electrode block 12 in an even row. Therefore, in the second touch sub-phase, a second row of touch electrode blocks 12 and a fourth row of touch electrode blocks 12 are subjected to touch detection at the same time. The plurality of touch source lines 21 transmit the touch driving signals to the second row and the fourth row of touch electrode blocks 12 through the touch line groups 11a, and the second row and the fourth row of touch electrode blocks 12 output the touch sensing signals through the touch source lines 21.

Thus, full-screen touch detection is achieved through time-division touch of a plurality of touch sub-phases.

In the display phase, the touch display panel implements the display function. For any multiplex selection unit 31, in the display phase, the multiplex selection unit 31 conducts signal transmission routes between the second input end of the multiplex selection unit 31 and two output ends of the multiplex selection unit 31, so that the common voltage signals are transmitted between the common voltage source line 22 and adjacent in touch electrode blocks 12 in the same column through the multiplex selection unit 31. In the display phase, one multiplex selection unit 31 may conduct signal transmission routes between the second input end of the multiplex selection unit 31 and the m output ends of the multiplex selection unit 31 to cause that the common voltage signal of the common voltage source line 22 is transmitted to each touch electrode block 12 at the same time.

It can be known from that the touch line group 11a transmits the touch signal in the touch phase and transmits the common voltage signal in the display phase.

In the embodiment, one multiplex selection unit has two input ends, where the first input end is arranged corresponding to and electrically connected to one touch source line, and the second input end is electrically connected to the common voltage source line. In the embodiment, one multiplex selection unit has m output ends, and the touch signals may be transmitted between one touch source line and m touch electrode blocks in time division, so that the number of touch signal ports is reduced and the cost is reduced; the number of touch source lines in a non-display region is greatly reduced, and a narrow border is achieved; and a problem that a touch area is increased and touch precision is reduced due to the insufficient number of touch signal ports can also be solved, and the touch precision is improved. In the embodiment, the common voltage source line and the touch source line transmit signals through touch line groups to the touch electrode blocks in time division, so that the number of traces of a display region is reduced, the coupling influence between the trace and the touch electrode block is reduced, and the display effect can be improved. In addition, the common voltage source line and the touch source line are located on a same side of the display region, and compared with the related art, the present disclosure reduces an area occupied by the traces of the common voltage source line in the non-display region, and the narrow border is achieved.

Figure 3:
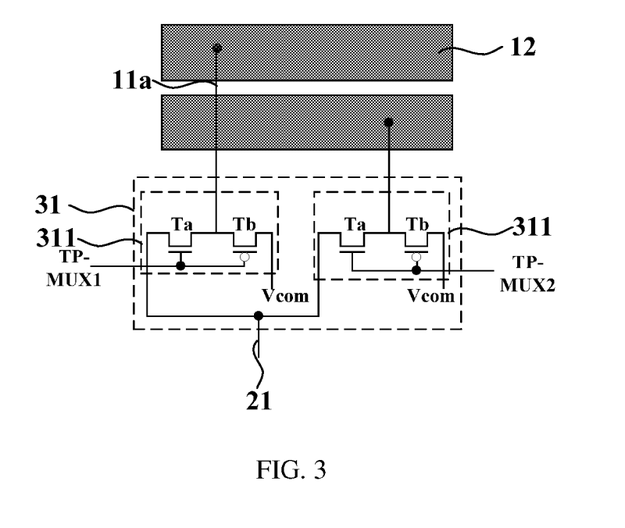
FIG. 3 is a schematic diagram of a multiplex selection unit according to an embodiment of the present disclosure.

Exemplarily, on the basis of the above technical solution, as shown in FIG. 3, optionally, the multiplex selection unit 31 includes m switching units 311, and an output end of each switching unit 311 is electrically connected to one touch line group 11a, where the each switching unit 311 includes a first switching element Ta and a second switching element Tb, an input end of the first switching element Ta is electrically connected to the touch source line 21, an input end of the second switching element Tb is electrically connected to the common voltage source line VCOM, an output end of the first switching element Ta and an output end of the second switching element Tb both are electrically connected to the touch line group 11a, and a control end of the first switching element Ta and a control end of the second switching element Tb are electrically connected with each other and receive a touch timing signal; turn-on voltages of the first switching element Ta and the second switching element Tb are opposite. Optionally, the first switching element Ta is an N-type metal oxide semiconductor (NMOS), and the second switching element is a P-type metal oxide semiconductor (PMOS). In other embodiments, further optionally; the first switching element Ta is the PMOS, and the second switching element is the NMOS.

In the embodiment, one multiplex selection unit 31 includes in switching unit 311. m=2 shown in FIG. 3 is taken as an example, one multiplex selection unit 31 includes two switching units 311, and one switching unit 311 is arranged corresponding and electrically connected to one touch line group 11a, Each switching unit 311 in one multiplex selection unit 31 receives different touch timing signals. Here, optionally, when m=2, one switching unit 311 in the multiplex selection unit 31 receives a first touch timing signal TP-MUX1, and another switching unit 311 in the multiplex selection unit 31 receives a second touch timing signal TP-MUX2.

As shown in FIG. 3, the switching unit 311 includes the first switching element Ta and the second switching element Tb.

The input end of the first switching element Ta is electrically connected to the touch source line 21, the output end of the first switching element Ta is electrically connected to the touch line group 11a, and the control end of the first switching element Ta receives the touch timing signal. The touch timing signal controls whether the first switching element Ta is conductive. When the touch timing signal controls the first switching element Ta to be conductive, the transmission route between the touch source line 21 and the touch line group 11a is conductive, the transmission of the touch signal is achieved between the touch source line 21 and the touch electrode block 12, and the touch function of the touch phase is implemented. The input end of the second switching element Tb is electrically connected to the common voltage source line Vcom, the output end of the second switching element Tb is electrically connected to the touch line group 11a, and the control end of the second switching element Tb receives a same touch timing signal. The touch timing signal controls whether the second switching element Tb is conductive. When the touch timing signal controls the second switching element Tb to be conductive, the transmission route between the common voltage source line Vcom and the touch line group 11a is conductive, the transmission of the common voltage signal is achieved between the common voltage source line Vcom and the touch electrode block 12, and the display function of the display phase is implemented.

It is known that the touch phase and the display phase must be time-divided, the control end of the first switching element Ta in the switching unit 311 and the control end of the second switching element Tb in the switching unit 311 receive the same touch timing signal. Therefore, when the touch timing signal controls the first switching element Tb to be conductive, the second switching element Tb is turned off, and when the touch timing signal controls the second switching element Tb to be conductive, the first switching element Ta is turned off. Based on this, optionally, the turn-on voltages of the first switching element Ta and the second switching element Tb are opposite.

As shown in FIG. 3, optionally; the first switching element Ta is the NMOS, the second switching element is the PMOS, and the touch timing signal includes a high level signal and a low level signal. In the touch phase, the touch timing signal is outputted as the high level signal to control the first switching element Ta to be conductive and the second switching element Tb to be turned off, and the touch signal is transmitted between the touch source line 21 and the touch electrode block 12. In the display phase, the touch timing signal is outputted as the low level signal to control the first switching element Ta to be turned off and the second switching element Tb to be conductive. It can be understood that in the touch phase, different switching units perform the touch signal transmission in time division, and therefore, the touch timing signals received by the different switching units in the multiplex selection unit are different.

Figure 4:
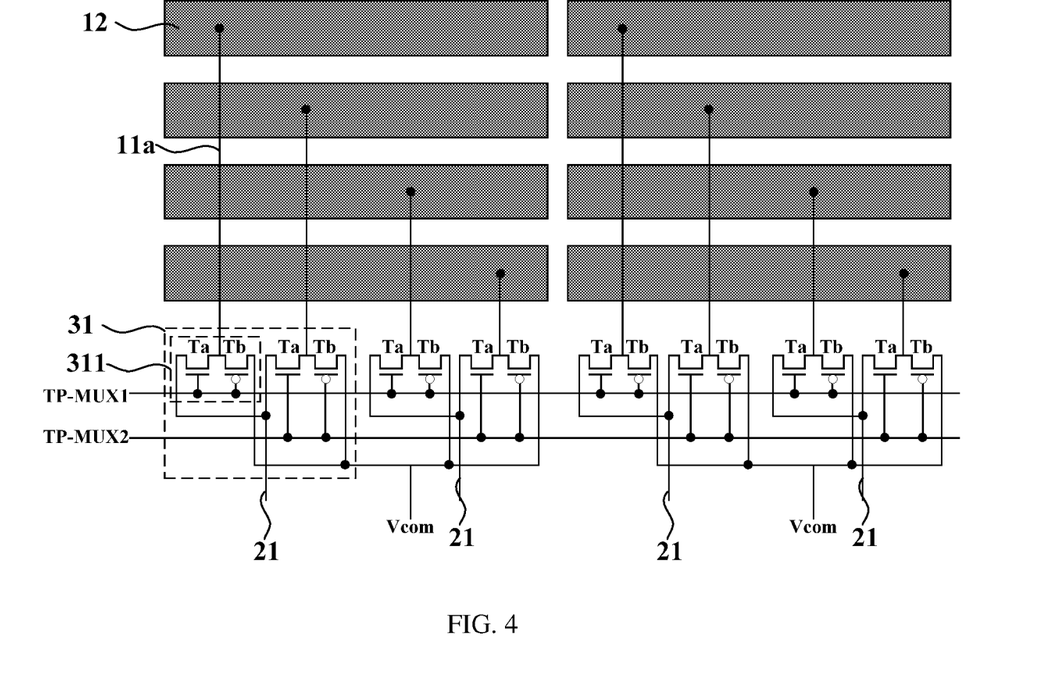
FIG. 4 is a schematic diagram of a touch display panel according to an embodiment of the present disclosure.

Optionally, as shown in FIG. 4, the touch display panel further includes m touch timing lines; in the multiplex selection unit 31, one switching unit 311 is arranged corresponding to one touch timing line, control ends of the switching unit 311 are electrically connected to the touch timing line, and control ends of the switching units 311 corresponding to a row of touch electrode blocks 12 are electrically connected to a same touch timing line, where m is an integer greater than or equal to 2; the touch phase includes m touch sub-phases; in the touch sub-phase, one touch timing line controls a route between the first input end and the output end of the switching unit 311 electrically connected to the one touch timing line to be conductive, and each of the other touch timing lines controls a route between the first input end and the output end of the switching unit 311 electrically connected to the each of the other touch timing lines to be close.

In the embodiment, the multiplex selection unit 31 includes m switching units 311, which are sequentially from a first switching unit to an m-th switching unit, and m touch timing lines are sequentially from a first touch timing line to an m-th touch timing line, where the first touch timing line is electrically connected to control ends of the first switching unit of each multiplex selection unit 31, the second touch timing line is electrically connected to control ends of the second switching unit of the each multiplex selection unit 31, and so on, the i-th touch timing line is electrically connected to control ends of the i-th switching unit of the each multiplex selection unit 31, and the m-th touch timing line is electrically connected to control ends of the m-th switching unit of the each multiplex selection unit 31, where i is a positive integer less than m.

The control ends of the switching units 311 corresponding to a row of touch electrode blocks 12 are electrically connected to the same touch timing line. When m=3, the first touch timing line is electrically connected to control ends of the first switching unit of the each multiplex selection unit 31, to achieve touch and display control over multi-row touch electrode blocks of a first row, a fourth row, a seventh row, a tenth row, and so on; the second touch timing line is electrically connected to control ends of the second switching unit of the each multiplex selection unit 31, to achieve touch and display control of multi-row touch electrode blocks of a second row, a fifth row, an eighth row, an eleventh row, and so on; and the third touch timing line is electrically connected to control ends of the third switching unit of the each multiplex selection unit 31, to achieve touch and display control of multi-row touch electrode blocks of a third row, a sixth row, a ninth row, a twelfth row, and so on. Thus, the full-screen touch and display are achieved.

As shown in FIG. 4, optionally; in 2, and the touch timing line includes the TP-MUX1 and the TP-MUX2. Control ends of switching units 311 corresponding to touch electrode blocks 12 in odd rows are electrically connected the TP-MUX1, and control ends of switching units 311 corresponding to touch electrode blocks 12 in even rows are electrically connected to the TP-MUX2.

When m=2, the touch phase TP includes a first touch sub-phase TPA and a second touch sub-phase TPB.

Figure 5:
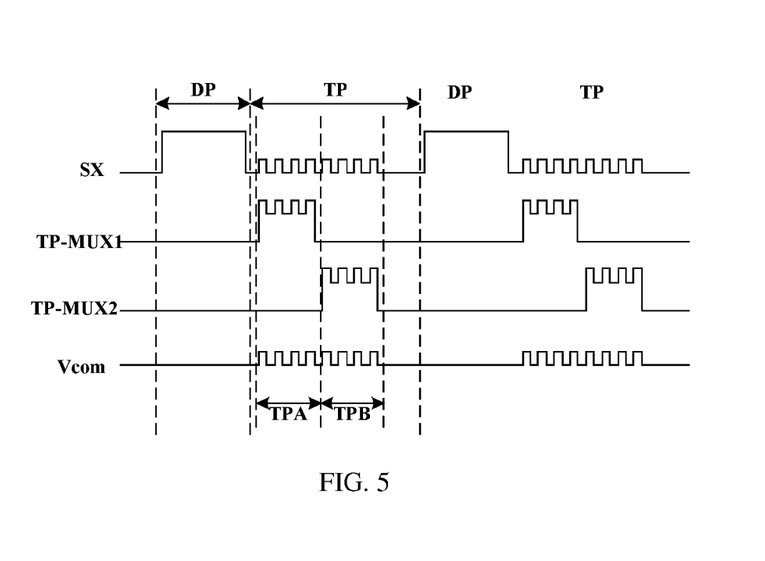
FIG. 5 is a driving timing diagram of FIG. 4.

As shown in FIG. 5, in the first touch sub-phase TPA, the TP-MUX1 outputs a high level signal and controls the first switching element Ta of the first switching unit 311 in each multiplex selection unit 31 to be conductive and the second switching element Tb of the first switching unit 311 in the each multiplex selection unit 31 to be turned off, so that the touch signal transmission is achieved between a touch source line SX corresponding to the each multiplex selection unit 31 and the touch electrode block 12 in the odd row, and touch detection in the touch phase is achieved. At the same time, the TP-MUX2 outputs a low level signal and controls the first switching element Ta of the second switching unit 311 in the each multiplex selection unit 31 to be turned off and the second switching element Tb of the second switching unit 311 in the each multiplex selection unit 31 to be conductive, so that transmission of the first voltage signal is achieved between a common voltage source line Vcom and the touch electrode block 12 in the even row, where optionally, the first voltage signal has the same pulse as the touch signal. Here, the touch electrode blocks 12 in the even rows receive the first voltage signal Vcom which is the same as the touch signal, so that the uniformity of the fall-screen touch signals can be achieved, the visible phenomenon of the touch electrode block is avoided, and the display effect is improved.

In the second touch sub-phase TPB, the TP-MUX2 outputs a high level signal and controls the first switching element Ta of the second switching unit 311 in the each multiplex selection unit 31 to be conductive and the second switching element Tb of the second switching unit 311 in the each multiplex selection unit 31 to be turned off, so that the touch signal transmission is achieved between the touch source line SX corresponding to the each multiplex selection unit 31 and the touch electrode block 12 in the even row, and the touch detection in the touch phase is achieved. At the same time, the TP-MUX1 outputs a low level signal and controls the first switching element Ta of the first switching unit 311 in the each multiplex selection unit 31 to be turned off and the second switching element Tb of the first switching unit 311 in the each multiplex selection unit 31 to be conductive, so that transmission of the first voltage signal is achieved between the common voltage source line Vcom and the touch electrode block 12 in the odd row, where optionally, the first voltage signal has the same pulse as the touch signal. Here, the touch electrode blocks 12 in the odd rows receive the first voltage signal VCOM which is the same as the touch signal, so that the uniformity of the full-screen touch signals can be achieved, the visible phenomenon of the touch electrode block is avoided, and the display effect is improved.

In the display phase (DP), the TP-MUX1 and the TP-MUX2 each output a low level signal and control the first switching element Ta in the each multiplex selection unit 31 to be turned off and the second switching element Tb in the each multiplex selection unit 31 to be conductive, so that transmission of a common voltage signal Vcom is achieved between the common voltage source line Vcom and each touch electrode block 12, where optionally, the common voltage signal is a constant current signal. The full-screen display can be achieved, the visible phenomenon of the touch electrode block can be avoided, and the display effect can be improved.

Figure 6:
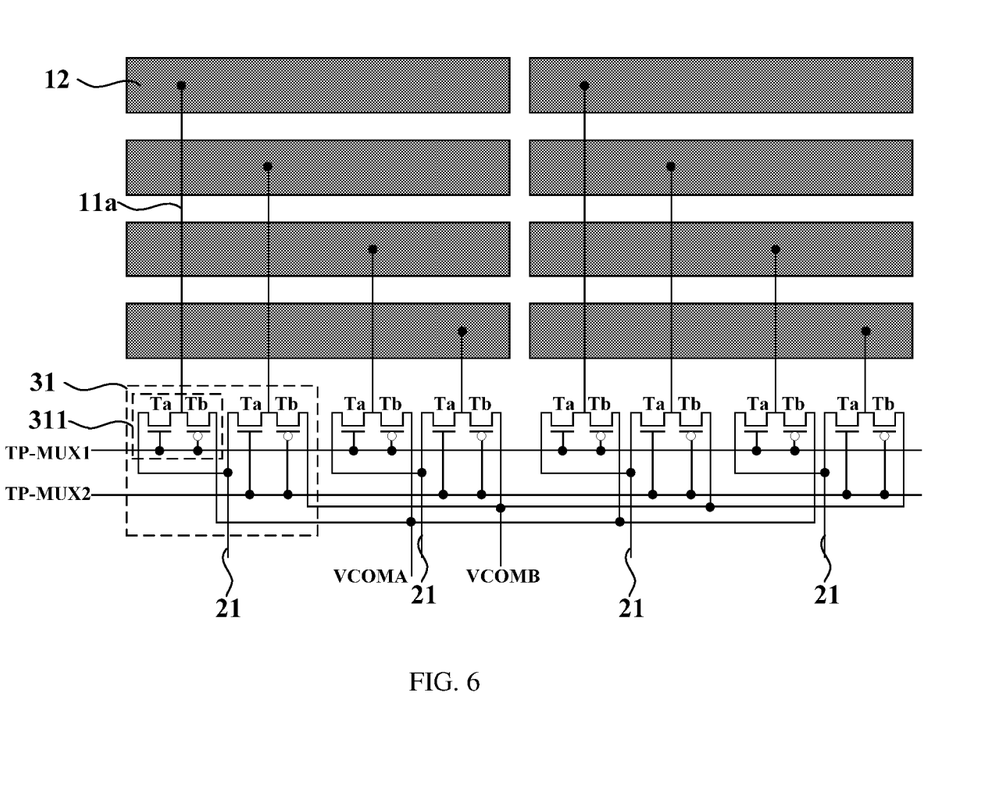
FIG. 6 is a schematic diagram of a touch display panel according to an embodiment of the present disclosure.
Figure 7:
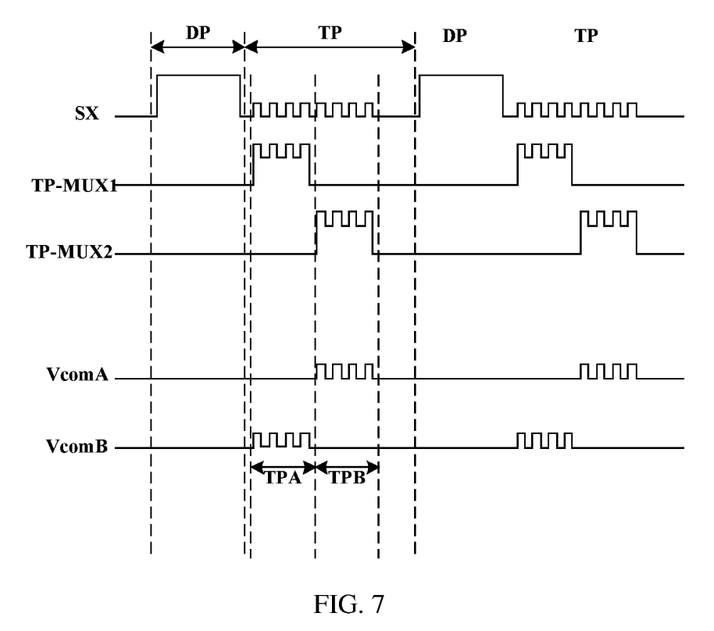
FIG. 7 is a driving timing diagram of FIG. 6.

As shown in FIG. 6, optionally, the common voltage source line includes a first common lead VCOMA and a second common lead VCOMB, second input ends of the switching units 31 corresponding to touch electrode blocks 12 in the odd rows are electrically connected to the first common lead VCOMA, and second input ends of the switching units 31 corresponding to touch electrode blocks 12 in the even rows are electrically connected to the second common lead VCOMB. In the display phase, a route between a second input end and an output end of each switching unit 31 is conductive, the first common lead VCOMA transmits a common voltage signal (labeled as VCOMA) to the a touch signal line, and the second common lead VCOMB transmits a common voltage signal (labeled as VCOMB) to a touch signal line. FIG. 7 is a driving timing diagram of the display panel shown in FIG. 6.

In the embodiment, when m=2, the first common lead VCOMA transmits the common voltage signals to the touch electrode blocks 12 in the odd rows, and the second common lead VCOMB transmits the common voltage signals to the touch electrode blocks 12 in the even rows. FIG. 7 differs from FIG. 5 in that the touch display panel includes two common leads that are independent of each other.

When in =2, the touch phase TP includes the first touch sub-phase TPA and the second touch sub-phase TPB.

FIG. 7 differs from FIG. 5 in that in the first touch sub-phase TPA, when the TP-MUX2 outputs a low level signal, the TP-MUX2 controls the first switching element Ta of the second switching unit 311 in the each multiplex selection unit 31 to be turned off and the second switching element Tb of the second switching unit 311 in the each multiplex selection unit 31 to be conductive, so that the transmission of the first voltage signal is achieved between the second common lead WOMB and the touch electrode block 12 in the even row, where optionally, the first voltage signal has the same pulse as the touch signal.

In the second touch sub-phase TPB, the TP-MUX1 outputs the low level signal and controls the first switching element Ta of the first switching unit 311 in the each multiplex selection unit 31 to be turned off and the second switching element Tb of the first switching unit 311 in the each multiplex selection unit 31 to be conductive, so that the transmission of the first voltage signal is achieved between the first common lead VcomA and the touch electrode block 12 in the odd row; where optionally, the first voltage signal has the same pulse as the touch signal.

In the display phase DP, the TP-MUX1 and the TP-MUX2 each output the low level signal, and control the first switching element Ta in the each multiplex selection unit 31 to be turned off and the second switching element Tb in the each multiplex selection unit 31 to be conductive, so that the transmission of a common voltage signal Vcom is achieved between the first common lead and a touch electrode block 12 and between the second common lead and a touch electrode block 12, where optionally, the common voltage signal is the constant current signal.

In the embodiment, the touch display panel includes the first common lead and the second common lead, which has the function that in an earlier test of the touch display panel, different common voltage signals may be applied to different touch electrode blocks simultaneously through the first common lead and the second common lead, so that the touch display panel is subjected to display detection to improve the detection precision. After the touch display panel is applied, the same common voltage signal may be provided for the touch electrode blocks through the first common lead and the second common lead, so that the full-screen display driving is achieved.

It can be understood that the numbers of first common leads and second common leads are designed based on m=2. In other embodiments, the specific value of m is changed, and the number of common leads is also changed, where the number of common leads is equal to the value of m. m=3 is taken as an example, first to third common leads are included, where the first common lead is electrically connected to the input end of the second switching element of the first switching unit of each multiplex selection unit, the second common lead is electrically connected to the input end of the second switching element of the second switching unit of the each multiple selection unit, and the third common lead is electrically connected to the input end of the second switching element of the third switching unit of the each multiplex selection unit.

Figure 8:
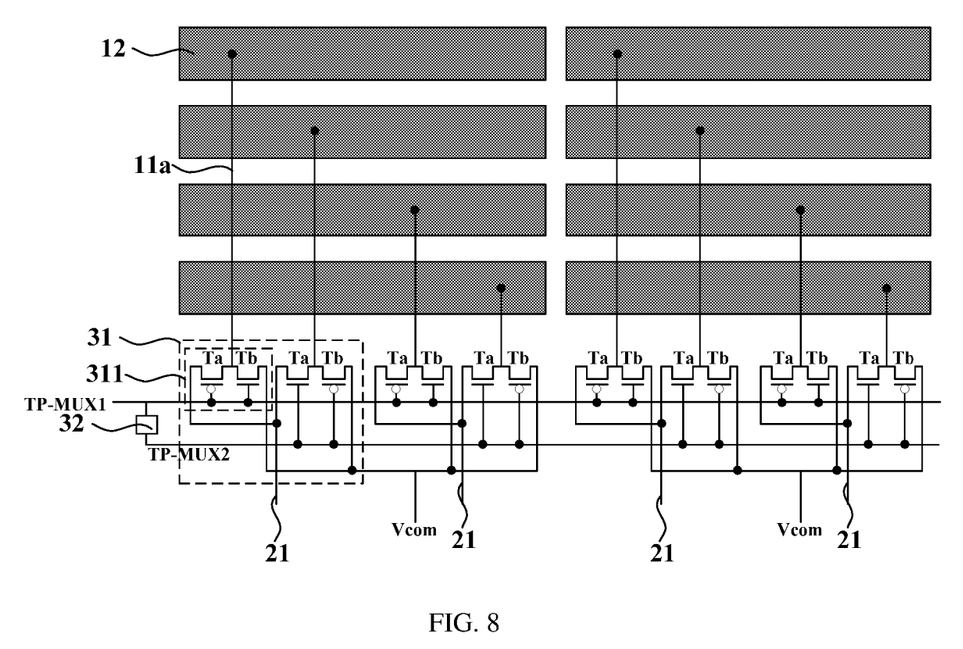
FIG. 8 is a schematic diagram of a touch display panel according to an embodiment of the present disclosure.

Optionally, when m=2, as shown in FIG. 8, the touch timing lines includes a first touch timing line TP-MUX1 and a second touch timing line TP-MUX2, the second touch timing line TP-MUX2 is electrically connect to the first touch timing line TP-MUX1 through an inverter 32, the control ends of the switching units 311 corresponding to the touch electrode blocks 12 in the odd rows are electrically connected to the first touch timing line TP-MUX1, and the control ends of the switching units 311 corresponding to the touch electrode blocks 12 in the even rows are electrically connected to the second touch timing line TP-MUX2, where turn-on voltages of first switching elements Ta of two switching units 311 in the multiplex selection unit 31 are opposite, and turn-on voltages of second switching elements Tb of the two switching units 311 are opposite.

In the embodiment, optionally, the first switching elements Ta of the switching units 311 corresponding to the odd rows each are the PMOS and the second switching elements Tb of the switching units 311 corresponding to the odd rows each are the NMOS; and the first switching elements Ta of the switching units 311 corresponding to the even rows each are the NMOS and the second switching elements Tb of the switching units 311 corresponding to the even rows each are the PMOS.

The TP-MUX1 is electrically connected to the control ends of the switching units 311 corresponding to the odd rows, and the TP-MUX2 is electrically connected to the control ends of the switching units 311 corresponding to the even rows.

When an output of the TP-MUX1 is the high level, the output is inverted by the inverter 32 and an output of the TP-MUX2 is the low level. At this time, the first switching elements Ta of the switching units 311 corresponding to the odd rows each are turned off and the second switching elements Tb of the switching units 311 corresponding to the odd rows each are conductive; and the first switching elements Ta of the switching units 311 corresponding to the even rows each are turned off and the second switching elements Tb of the switching units 311 corresponding to the even rows each are conductive. The common voltage signal is transmitted to each touch electrode block 12. Therefore, the phase is the display phase.

When an output of the TP-MUX1 is the low level, the output is inverted by the inverter 32, and an output of the TP-MUX2 is the high level. At this time, the first switching elements Ta of the switching units 311 corresponding to the odd rows each are conductive and the second switching elements Tb of the switching units 311 corresponding to the odd rows each are turned off; and the first switching elements Ta of the switching units 311 corresponding to the even rows each are conductive and the second switching elements Tb of the switching units 311 corresponding to the even rows each are turned off. The touch signal is transmitted to each touch electrode block 12. Therefore, the phase is the touch phase.

It can be understood that the touch phase further includes two touch sub-phases, where the first touch sub-phase controls the touch signals to be transmitted to the touch electrode blocks in the odd rows to achieve the transmission of the touch signal, and the second touch sub-phase controls the touch signals to be transmitted to the touch electrode blocks in the even rows to achieve the transmission of the touch signal. Here, the touch phase is divided into the first touch sub-phase and the second touch phase, and specifically, the delay and inversion of the touch timing signal can be achieved by adding a delayer in the inverter.

In the embodiment, a touch signal port is provided in a driving chip of a lower boarder, and two different touch timing signals are outputted through the inverter, where the two touch timing signals are the TP-MUX1 and the TP-MUX2. Apparently, the number of touch signal ports is reduced, and an area of the lower border occupied by the touch timing line is further reduced.

Based on the embodiments described above, in the embodiments of the present disclosure, the touch timing line may also not occupy space of the lower boarder by changing the pull wire manner of the multiplex selection unit.

Exemplarily, on the basis of the technical solutions described above, as shown in FIG. 9, optionally, the touch display panel further includes a first common voltage source line 41, a common voltage timing line 41, a plurality of common voltage switching elements 43 and a plurality of common voltage signal lines 44, where one touch electrode block 12 is electrically connected to one common voltage signal line 44, an input end of one common voltage switching element 43 is electrically connected to the first common voltage source line 41, an output end of one common voltage switching element 43 corresponds to and is electrically connected to one common voltage signal line 44, and a control end of one common voltage switching element 43 is electrically connected to the common voltage timing line 42; in the display phase, a common voltage timing signal outputted by the common voltage timing line 42 controls the plurality of common voltage switching elements 43 to be conductive at the same time, and the first common voltage source line 41 transmits the common voltage signal to each common voltage signal line 44. Here, a portion of the trace electrically connecting the touch electrode block 12 to the common voltage switching element 43 is defined as the common voltage signal line 44, and a portion of the trace electrically connecting the touch electrode block 12 to the switching unit 311 is defined as a touch signal line 11.

Figure 9:
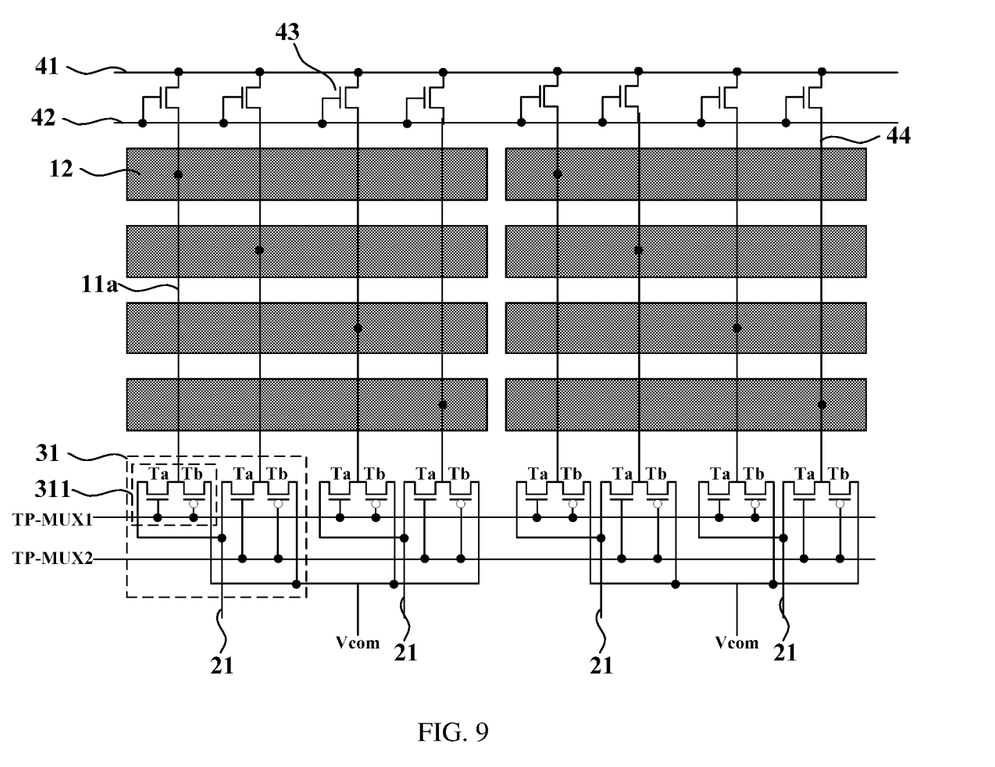
FIG. 9 is a schematic diagram of a touch display panel according to an embodiment of the present disclosure.

In the embodiment, optionally, the first common voltage source line 41, the common voltage timing line 42, and the plurality of common voltage switching elements 43 are provided in a non-display region on an upper side of the display region 1, and a non-display region 2 on a lower side of the display region 1 is provided with a circuit structure such as a multiplex selection circuit 3, and the like.

In the embodiment, the common voltage timing line 42 is electrically connected to the control ends of the common voltage switching elements 43, the first common voltage source line 41 is electrically connected to the input ends of the common voltage switching elements 43, and the common voltage signal line 44 is electrically connected to the output end of the common voltage switching element 43. The common voltage timing line 42 controls the common voltage switching elements 43 to be conductive or close at the same time, and when the common voltage switching elements 43 are conductive, a common voltage signal of the first common voltage source line 41 is transmitted to the touch electrode blocks 12 through the common voltage switching elements 43.

In the display phase, the common voltage timing line 42 controls the common voltage switching elements 43 to be conductive at the same time, and the common voltage signal of the first common voltage source line 41 is transmitted to the touch electrode blocks 12 through the common voltage signal lines 44. At the same time, the multiplex selection unit 31 conducts a signal transmission route between the second input end of the multiplex selection unit 31 and the output end of the multiplex selection unit 31 to cause that the common voltage signal of the common voltage source line 22 electrically connected to the multiplex selection circuit 3 is transmitted to the touch electrode block 12 through a touch line group 11a. Thus, one touch electrode block 12 receives the common voltage signal through the touch line group 11a and the common voltage signal line 44 at the same time, so that the driving capability of the common voltage signal and the uniformity on the whole surface of the common voltage signals are enhanced, the screen splitting phenomenon of the touch display panel is avoided, and the display effect is improved.

Figure 10:
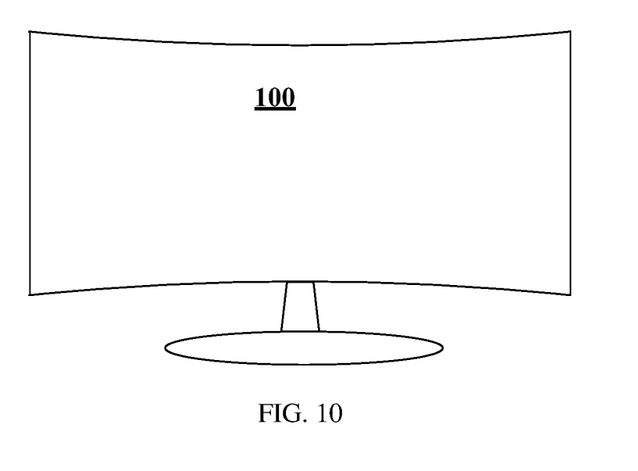
FIG. 10 is a schematic diagram of a display apparatus according to an embodiment of the present disclosure.

Based on the same inventive concept, the embodiments of the present disclosure further provide a display apparatus. As shown in FIG. 10, the display apparatus 100 provided in the embodiment includes the touch display panel as described in any of the embodiments above. Optionally, the display apparatus 100 may be used as an onboard display product in an automobile, specifically as a screen in a main control region of the automobile for use by a user.

In other embodiments, optionally; the display apparatus is further applied to a smartphone, a tablet computer and the like, and optionally, the display apparatus is an organic light-emitting display apparatus or a liquid crystal display apparatus or other types of display apparatuses. The above embodiments are merely illustrative of the structure of the touch display panel in the display apparatus, and substantially the display apparatus further includes other structures, not specifically illustrated and described herein. In addition, most of the above embodiments make illustration by taking in =2 as an example, and in other embodiments, optionally, m may be selected as another value, and when m is changed, the numbers of related structures such as the touch timing lines, the common leads, and the like change, which is not specifically exemplified and described herein.

It is to be noted that the above are merely preferred embodiments of the present disclosure and the technical principles used therein. It can be understood by those skilled in the art that the present disclosure is not limited to the specific embodiments described herein. Those skilled in the art can make various apparent modifications, adaptations, combinations and substitutions without departing from the scope of the present disclosure. Therefore, while the present disclosure has been described in detail through the above-mentioned embodiments, the present disclosure is not limited to the above-mentioned embodiments and may further include more other equivalent embodiments without departing from the concept of the present disclosure. The scope of the present disclosure is determined by the scope of the appended claims.

What is claimed is:

1. A touch display panel, comprising: a display region and a non-display region surrounding the display region;

wherein the display region comprises a plurality of touch signal lines and a plurality of touch electrode blocks arranged in an array, and the plurality of touch electrode blocks are electrically connected in one-to-one correspondence with a plurality of touch line groups, wherein each of the plurality of touch line groups comprises at least one of the plurality of touch signal lines;

wherein the non-display region comprises a plurality of touch source lines, at least one common voltage source line and a multiplex selection circuit, wherein the multiplex selection circuit comprises a plurality of multiplex selection units, the plurality of multiplex selection units is arranged in one-to-one correspondence with the plurality of touch source lines, and each of the plurality of multiplex selection units has m output ends, wherein each of the m output ends of the each of the plurality of multiplex selection units is electrically connected to one of the plurality of touch line groups, a first input end of the each of the plurality of multiplex selection units is electrically connected to one of the plurality of touch source lines, and a second input end of the each of the plurality of multiplex selection units is electrically connected to one of the at least one common voltage source line;

wherein in a touch phase, the each of the plurality of multiplex selection units conducts signal transmission routes of the first input end of the each of the plurality of multiplex selection units and the m output ends of the each of the plurality of multiplex selection units to cause touch line groups corresponding to the each of the plurality of multiplex selection units to transmit touch signals; and wherein in a display phase, the each of the plurality of multiplex selection units conducts signal transmission routes of the second input end of the each of the plurality of multiplex selection units and the m output ends of the each of the plurality of multiplex selection units to cause the touch line groups corresponding to the each of the plurality of multiplex selection units to transmit common voltage signals;

wherein the each of the plurality of multiplex selection units comprises in switching units, an output end of each of the m switching units is electrically connected to one of the plurality of touch line groups, wherein the each of the m switching units comprises a first switching element and a second switching element, an input end of the first switching element is electrically connected to the one of the plurality of touch source lines, an input end of the second switching element is electrically connected to the one of the at least one common voltage source line, an output end of the first switching element and an output end of the second switching element both are electrically connected to the one of the plurality of touch line groups, and a control end of the first switching element and a control end of the second switching element are electrically connected with each other and receive a touch timing signal;

wherein turn-on voltages of the first switching element and the second switching element are opposite; and wherein m is an integer greater than or equal to 2.

2. The touch display panel of claim 1, wherein
the first switching element is an N-type metal oxide semiconductor (NMOS), and the second switching element is a P-type metal oxide semiconductor (PMOS); or
the first switching element is the PMOS, and the second switching element is the NMOS.

3. The touch display panel of claim 1, further comprising m touch timing lines;

wherein in the one of the plurality of multiplex selection units, the each of the m switching units is arranged corresponding to one of the m touch timing lines, control ends of the one of the m switching units are electrically connected to the one of the m touch timing lines, control ends of switching units corresponding to a row of touch electrode blocks are electrically connected to a same touch timing line, wherein m is an integer greater than or equal to 2; and wherein the touch phase comprises m touch sub-phases; wherein in one of the m touch sub-phases, the one of the m touch timing lines controls routes between first input ends and output ends of the switching units electrically connected to the one of the m touch timing lines to be conductive, and each of other touch timing lines controls routes between first input ends and output ends of switching units electrically connected to the each of other touch timing lines to be close.

4. The touch display panel of claim 3, wherein when m=2, control ends of switching units corresponding to touch electrode blocks in odd rows are electrically connected to a same touch timing line, and control ends of switching units corresponding to touch electrode blocks in even rows are electrically connected to another touch timing line.

5. The touch display panel of claim 4, wherein two touch timing lines are provided, wherein the two touch timing lines are a first touch timing line and a second touch timing line, the second touch timing line is electrically connected to the first touch timing line through an inverter, the control ends of the switching units corresponding to the touch electrode blocks in the odd rows are electrically connected to the first touch timing line, and the control ends of the switching units corresponding to the touch electrode blocks in the even rows are electrically connected to the second touch timing line;

wherein turn-on voltages of first switching elements of two switching units in the each of the plurality of multiplex selection units are opposite, and turn-on voltages of second switching elements of the two switching units are opposite.

6. The touch display panel of claim 3, wherein two common voltage source lines are provided, wherein the two common voltage source lines are a first common lead and a second common lead, second input ends of switching units corresponding to touch electrode blocks in odd rows are electrically connected to the first common lead, and second input ends of switching units corresponding to touch electrode blocks in even rows are electrically connected to the second common lead; and wherein in the display phase, a route between a second input end and an output end of the each of the m switching units is conductive, the first common lead transmits a common voltage signal corresponding to the first common lead to touch signal lines corresponding to the first common lead, and the second common lead transmits a common voltage signal corresponding to the second common lead to touch signal lines corresponding to the second common lead.

7. The touch display panel of claim 1, further comprising:
a first common voltage source line, a common voltage timing line, a plurality of common voltage switching elements and a plurality of common voltage signal lines, wherein the one of the plurality of touch electrode blocks is electrically connected to one of the plurality of common voltage signal lines, an input end of one of the plurality of common voltage switching elements is electrically connected to the first common voltage source line, an output end of the one of the plurality of common voltage switching elements corresponds to and is electrically connected to the one of the plurality of common voltage signal lines, and a control end of the one of the plurality of common voltage switching elements is electrically connected to the common voltage timing line;

wherein in the display phase, a common voltage timing signal outputted by the common voltage timing line controls the plurality of common voltage switching elements to be conductive at the same time, and the first common voltage source line transmits the common voltage signal to each of the plurality of common voltage signal lines.

8. A display apparatus, comprising a touch display panel, wherein the touch display panel comprises:
a display region and a non-display region surrounding the display region;
wherein the display region comprises a plurality of touch signal lines and a plurality of touch electrode blocks arranged in an array, and the plurality of touch electrode blocks are electrically connected in one-to-one correspondence with a plurality of touch line groups, wherein each of the plurality of touch line groups comprises at least one of the plurality of touch signal lines;
wherein the non-display region comprises a plurality of touch source lines, at least one common voltage source line and a multiplex selection circuit, wherein the multiplex selection circuit comprises a plurality of multiplex selection units, the plurality of multiplex selection units is arranged in one-to-one correspondence with the plurality of touch source lines, and each of the plurality of multiplex selection units has m output ends, wherein each of the m output ends of the each of the plurality of multiplex selection units is electrically connected to one of the plurality of touch line groups, a first input end of the each of the plurality of multiplex selection units is electrically connected to one of the plurality of touch source lines, and a second input end of the each of the plurality of multiplex selection units is electrically connected to one of the at least one common voltage source line;
wherein in a touch phase, the each of the plurality of multiplex selection units conducts signal transmission routes of the first input end of the each of the plurality of multiplex selection units and the m output ends of the each of the plurality of multiplex selection units to cause touch line groups corresponding to the each of the plurality of multiplex selection units to transmit touch signals; and wherein in a display phase, the each of the plurality of multiplex selection units conducts signal transmission routes of the second input end of the each of the plurality of multiplex selection units and the m output ends of the each of the plurality of multiplex selection units to cause the touch line groups corresponding to the each of the plurality of multiplex selection units to transmit common voltage signals;

wherein the each of the plurality of multiplex selection units comprises in switching units, an output end of each of the m switching units is electrically connected to one of the plurality touch line groups, wherein the each of the m switching units comprises a first switching element and a second switching element, an input end of the first switching element is electrically connected to the one of the plurality of touch source lines, an input end of the second switching element is electrically connected to the one of the at least on common voltage source line, an output end of the first switching element and an output end of the second switching element both are electrically connected to the one of the plurality of touch line groups, and a control end of the first switching element and a control end of the second switching element are electrically connected with each other and receive a touch timing signal;

wherein turn-on voltages of the first switching element and the second switching element are opposite; and wherein m is an integer greater than or equal to 2.

9. The display apparatus of claim 8, wherein
the first switching element is an N-type metal oxide semiconductor (NMOS), and the second switching element is a P-type metal oxide semiconductor (PMOS); or the first switching element is the PMOS, and the second switching element is the NMOS.

10. The touch display panel of claim 8, further comprising m touch timing lines;

wherein in the one of the plurality of multiplex selection units, the each of the m switching units is arranged corresponding to one of the m touch timing lines, control ends of the one of the m switching units are electrically connected to the one of the m touch timing lines, control ends of switching units corresponding to a row of touch electrode blocks are electrically connected to a same touch timing line, wherein m is an integer greater than or equal to 2; and wherein the touch phase comprises m touch sub-phases; wherein in one of the m touch sub-phases, the one of the m touch timing lines controls routes between first input ends and output ends of the switching units electrically connected to the one of the m touch timing lines to be conductive, and each of other touch timing lines controls routes between first input ends and output ends of switching units electrically connected to the each of other touch timing lines to be close.

11. The touch display panel of claim 10, wherein when m=2, control ends of switching units corresponding to touch electrode blocks in odd rows are electrically connected to a same touch timing line, and control ends of switching units corresponding to touch electrode blocks in even rows are electrically connected to another touch timing line.

12. The touch display panel of claim 11, wherein two touch timing lines are provided, wherein the two touch timing lines are a first touch timing line and a second touch timing line, the second touch timing line is electrically connected to the first touch timing line through an inverter, the control ends of the switching units corresponding to the touch electrode blocks in the odd rows are electrically connected to the first touch timing line, and the control ends of the switching units corresponding to the touch electrode blocks in the even rows are electrically connected to the second touch timing line;

wherein turn-on voltages of first switching elements of two switching units in the each of the plurality of multiplex selection units are opposite, and turn-on voltages of second switching elements of the two switching units are opposite.

13. The touch display panel of claim 10, wherein two common voltage source lines are provided, wherein the two common voltage source lines are a first common lead and a second common lead, second input ends of switching units corresponding to touch electrode blocks in odd rows are electrically connected to the first common lead, and second input ends of switching units corresponding to touch electrode blocks in even rows are electrically connected to the second common lead; and wherein in the display phase, a route between a second input end and an output end of the each of the m switching units is conductive, the first common lead transmits a common voltage signal corresponding to the first common lead to touch signal lines corresponding to the first common lead, and the second common lead transmits a common voltage signal corresponding to the second common lead to touch signal lines corresponding to the second common lead.

14. The touch display panel of claim 8, further comprising: a first common voltage source line, a common voltage timing line, a plurality of common voltage switching elements and a plurality of common voltage signal lines, wherein the one of the plurality of touch electrode blocks is electrically connected to one of the plurality of common voltage signal lines, an input end of one of the plurality of common voltage switching elements is electrically connected to the first common voltage source line, an output end of the one of the plurality of common voltage switching elements corresponds to and is electrically connected to the one of the plurality of common voltage signal lines, and a control end of the one of the plurality of common voltage switching elements is electrically connected to the common voltage timing line;

wherein in the display phase, a common voltage timing signal outputted by the common voltage timing line controls the plurality of common voltage switching elements to be conductive at the same time, and the first common voltage source line transmits the common voltage signal to each of the plurality of common voltage signal lines.

* * * * *